(12) United States Patent
Cho

(10) Patent No.: US 8,922,071 B2
(45) Date of Patent: Dec. 30, 2014

(54) SWITCHED RELUCTANCE MOTOR

(71) Applicant: Samsung Electro-Mechanics Co., Ltd., Gyunggi-do (KR)

(72) Inventor: Yong Wan Cho, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 276 days.

(21) Appl. No.: 13/628,001

(22) Filed: Sep. 26, 2012

(65) Prior Publication Data

US 2013/0134806 A1  May 30, 2013

(30) Foreign Application Priority Data

Nov. 29, 2011 (KR) ........................ 10-2011-0126155

(51) Int. Cl.
*H02K 5/24* (2006.01)

(52) U.S. Cl.
USPC ................................ 310/51; 310/43; 310/166

(58) Field of Classification Search
USPC .................... 310/43, 51, 166, 168, 261.1, 269
See application file for complete search history.

(56) References Cited

U.S. PATENT DOCUMENTS

| 3,154,705 | A | * | 10/1964 | Essenburg | 310/51 |
| 5,604,388 | A | * | 2/1997 | Baker et al. | 310/51 |
| 5,780,945 | A | * | 7/1998 | Caviglia et al. | 310/51 |
| 2007/0194637 | A1 | * | 8/2007 | Childe et al. | 310/51 |
| 2008/0211340 | A1 | * | 9/2008 | Lee et al. | 310/217 |
| 2011/0121669 | A1 | * | 5/2011 | Lacour | 310/51 |
| 2013/0076212 | A1 | * | 3/2013 | Park et al. | 310/60 R |

FOREIGN PATENT DOCUMENTS

KR   10-2008-0026872    3/2008

* cited by examiner

*Primary Examiner* — Thanh Lam
(74) *Attorney, Agent, or Firm* — Ladas & Parry, LLP

(57) ABSTRACT

Disclosed herein is a switched reluctance motor including: a shaft forming the rotation center of the motor; a rotor part rotatably coupled onto the shaft; a first stopper coupled to an upper portion of the rotor part in the axial direction to support the rotor part; and a second stopper coupled to a lower portion of the rotor part in the axial direction to support the rotor part, wherein the first stopper or the second stopper has a separate internal space formed at an inner side thereof. A weight member is coupled to the internal space, thereby making it possible to secure stable and reliable rotation balancing even at the time of high speed rotation of the motor.

15 Claims, 4 Drawing Sheets

SWITCHED RELUCTANCE MOTOR

CROSS-REFERENCE TO RELATED APPLICATION

This application claims the benefit of Korean Patent Application No. 10-2011-0126155, filed on Nov. 29, 2011, entitled "Switched Reluctance Motor", which is hereby incorporated by reference in its entirety into this application.

BACKGROUND OF THE INVENTION

1. Technical Field

The present invention relates to a switched reluctance motor.

2. Description of the Related Art

A switched reluctance motor (SRM) generally called an SR motor rotates a rotor using a reluctance torque according to a change in magnetic reluctance as described in Korean Patent Laid-Open No. 10-2008-0026872. The switched reluctance motor has a low manufacturing cost, hardly requires maintenance, and has a permanent lifespan due to high reliability. The switched reluctance motor is configured to include: a stator part including a stator yoke and a plurality of stator salient poles protruded from the stator yoke; and a rotor part including a rotor core and a plurality of rotor salient poles protruded from the rotor core so as to face the stator salient poles and rotatably received in the stator part.

In the case of the switched reluctance motor according to the prior art, in order to maintain rotation balancing of a rotor, a balancing member coupled to the rotor has been used. As a method of coupling this balancing member to the rotor, a method of coupling an additional weight member to an upper surface or a side of the balancing member to maintain balancing has been used. However, in the case of coupling this additional weight member to the balancing member, the weight member is separated at the time of high speed rotation of the switched reluctance motor. Particularly, in the case of coupling the weight member to the side of the balancing member, wind noise occurs.

Further, in the case of controlling the balancing by appropriately cut-machining the balancing member, a dedicated machine for controlling a machined amount and a dust collector are separately required. Particularly, in the case in which a machined amount is large, wind noise occurs.

SUMMARY OF THE INVENTION

The present invention has been made in an effort to provide a switched reluctance motor in which a stopper is injected at an upper or lower portion of a rotor part in an axial direction so as to have an internal space formed therein in order to maintain balancing at the time of rotation of the switched reluctance motor and a weight member such as an adhesive, or the like, is coupled to the internal space or a set screw is coupled to a side of the stopper without being protruded, such that reliability in maintaining rotation balancing of the switched reluctance motor may be improved.

According to a preferred embodiment of the present invention, there is provided a switched reluctance motor including: a shaft forming the rotation center of the motor; a rotor part rotatably coupled onto the shaft; a first stopper coupled to an upper portion of the rotor part in the axial direction to support the rotor part; and a second stopper coupled to a lower portion of the rotor part in the axial direction to support the rotor part, wherein the first stopper or the second stopper has a separate internal space formed at an inner side thereof.

A weight member may be coupled to one side of the internal space of the first stopper or the second stopper.

The weight member may be an adhesive.

The rotor part may include an annular rotor core and a plurality of rotor poles protruded outwardly from the rotor core.

The first stopper or the second stopper may be manufactured by an injection method.

The first stopper or the second stopper may be formed as a balancing member for maintaining rotation balancing of the switched reluctance motor.

The switched reluctance motor may further include a stator part including a stator yoke receiving the rotor part therein and stator salient poles formed to be spaced apart from each other so as to correspond to the rotor poles and formed to be protruded inwardly of the stator yoke.

According to another preferred embodiment of the present invention, there is provided a switched reluctance motor including: a shaft forming the rotation center of the motor; a rotor part rotatably coupled onto the shaft; a first stopper coupled to an upper portion of the rotor part in the axial direction to support the rotor part; and a second stopper coupled to a lower portion of the rotor part in the axial direction to support the rotor part, wherein the first stopper or the second stopper has a separate internal space formed at an inner side thereof, and the first stopper or the second stopper includes a set screw coupled to one side thereof for rotation balancing of the motor.

The set screw may be coupled to the first stopper or the second stopper so as to be completely inserted into one side of the first stopper or the second stopper.

The rotor part may include an annular rotor core and a plurality of rotor poles protruded outwardly from the rotor core.

The first stopper or the second stopper may be manufactured by an injection method.

The first stopper or the second stopper may be formed as a balancing member for maintaining rotation balancing of the switched reluctance motor.

The switched reluctance motor may further include a stator part including a stator yoke receiving the rotor part therein and stator salient poles formed to be spaced apart from each other so as to correspond to the rotor poles and formed to be protruded inwardly of the stator yoke.

A weight member may be coupled to one side of the internal space of the first stopper or the second stopper.

The weight member may be an adhesive.

DESCRIPTION OF THE PREFERRED EMBODIMENTS

Figure 1:
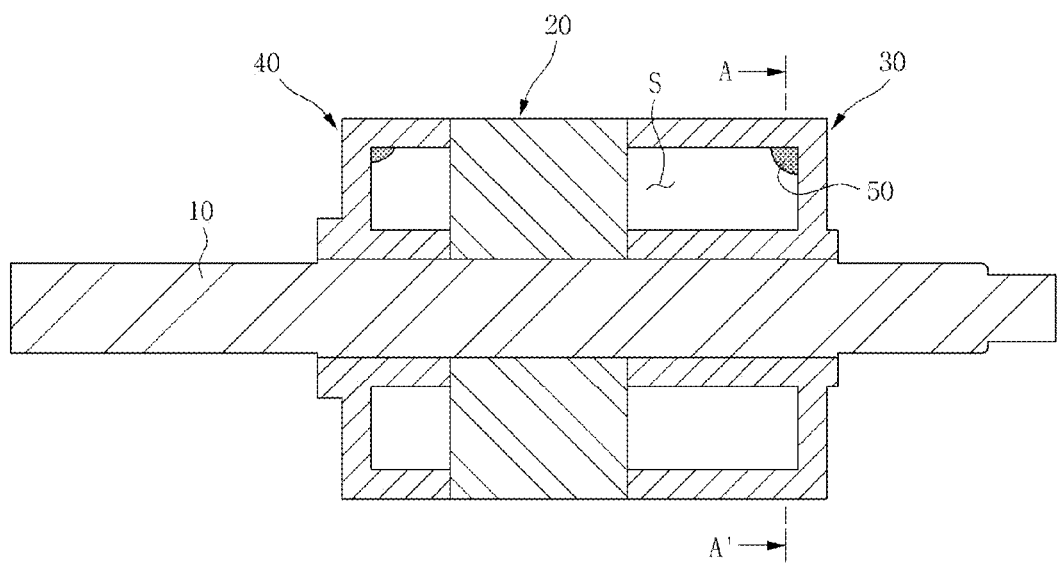
FIG. 1 is a cross-sectional view of a switched reluctance motor according to a preferred embodiment of the present invention.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In addition, the terms "first", "second", "one surface", "the other surface" and so on are used to distinguish one element from another element, and the elements are not defined by the above terms. In the present invention, an "axial direction" refers to a length direction in which a shaft 10 corresponding to the rotational center of the motor is formed. In describing the present invention, a detailed description of related known functions or configurations will be omitted so as not to obscure the gist of the present invention.

Hereinafter, preferred embodiments of the present invention will be described in detail with reference to the accompanying drawings.

Figure 2:
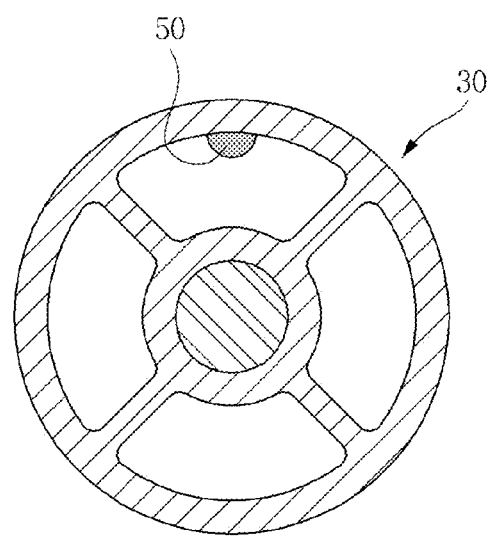
FIG. 2 is a cross-sectional view taken along the line A-A' of FIG. 1.

FIG. 1 is a cross-sectional view of a switched reluctance motor according to a preferred embodiment of the present invention; and FIG. 2 is a cross-sectional view taken along the line A-A' of FIG. 1.

The switched reluctance motor according to the preferred embodiment of the present invention includes a shaft 10 forming the rotation center of the motor; a rotor part 20 rotatably coupled onto the shaft 10; a first stopper 30 coupled to an upper portion of the rotor part 20 in the axial direction to support the rotor part 20; and a second stopper 40 coupled to a lower portion of the rotor part 20 in the axial direction to support the rotor part 20, wherein the first stopper 30 or the second stopper 40 has a separate internal space S formed at an inner side thereof.

The shaft 10 forms the rotational center of the motor and is formed to be extended in the axial direction. Particularly, the axial direction in the present invention, which is based on a direction in which the shaft 10 is formed, refers to directions toward upper and lower portions based on the shaft 10 shown in FIG. 1.

The rotor part 20 may be configured to include an annular rotor core 21 and a plurality of rotor poles protruded outwardly from the rotor core 21. The rotor core 21 has a hollow hole formed at a central portion thereof; and the shaft 10 is fixedly coupled to the hollow hole to thereby transfer rotation of the rotor part 20 to the outside. The plurality of rotor poles 22 may be formed to be protruded outwardly along an outer circumferential surface of the rotor core 21 and be formed to correspond to a stator salient pole 72 to be described below.

The first stopper 30 is coupled to the upper portion of the rotor part 20 in the axial direction to thereby serve to support the rotor part 20. The first stopper 30 is coupled to the shaft 10 while supporting the rotor part 20, thereby rotating together with the rotor part 20. The first stopper 30 may support the rotor part 20 in the axial direction and may be made of a resin such as a plastic, or the like, to to thereby be formed as a balancing member capable of adjusting rotation balancing at the time of rotation of the motor. Particularly, in the preferred embodiment of the present invention, the first stopper 30 is manufactured by an injection method so as to have a predetermined space formed in an inner portion thereof; such that a separate weight member 50 for balancing at the time of the rotation of the motor may be formed in the internal space S of the first stopper 30. In the case of forming the weight member 50 for rotation balancing on an outer side of the first stopper 30, the weight member 50 is separated, or wind noise occurs according to a position at which the weight member 50 is formed. In order to solve these problems, the first stopper 30 may be manufactured by injection processing so as to have a predetermined internal space S formed in the inner portion thereof and the weight member 50 for appropriately controlling the rotation balancing may be then adhered to one side of the internal space S of the first stopper 30. The weight member 50 may be made of an adhesive to increase adhesion, but is not limited to being made of this material. Therefore, various members for the rotation balancing may be formed in the internal space S of the first stopper 30.

In addition, the first stopper 30 may be formed by processing a plastic, or the like, or be formed integrally with the rotor part 20 by injection.

The second stopper 40 is coupled to the lower portion of the rotor part 20 in the axial direction to thereby serve to support the rotor part 20. The second stopper 40 has a configuration similar to that of the first stopper 30 described above. In addition, a material and a manufacturing method of the second stopper 30 are the same as those of the first stopper 30 described above. The second stopper 40 may also be made of a plastic material to thereby be used as a balancing member for maintaining the rotation balancing of the rotor part 20. The second stopper 40 may be manufactured by injection processing so as to have a predetermined internal space S formed in an inner portion thereof and the weight member 50 for appropriately controlling the rotation balancing may be then adhered to one side of the internal space S of the second stopper 40, similar to the first stopper 30. The weight member 50 may be made of an adhesive to increase adhesion, but is not limited to being made of this material. Therefore, various members for the rotation balancing may be formed on one side of the internal space S of the second stopper 40.

Figure 3:
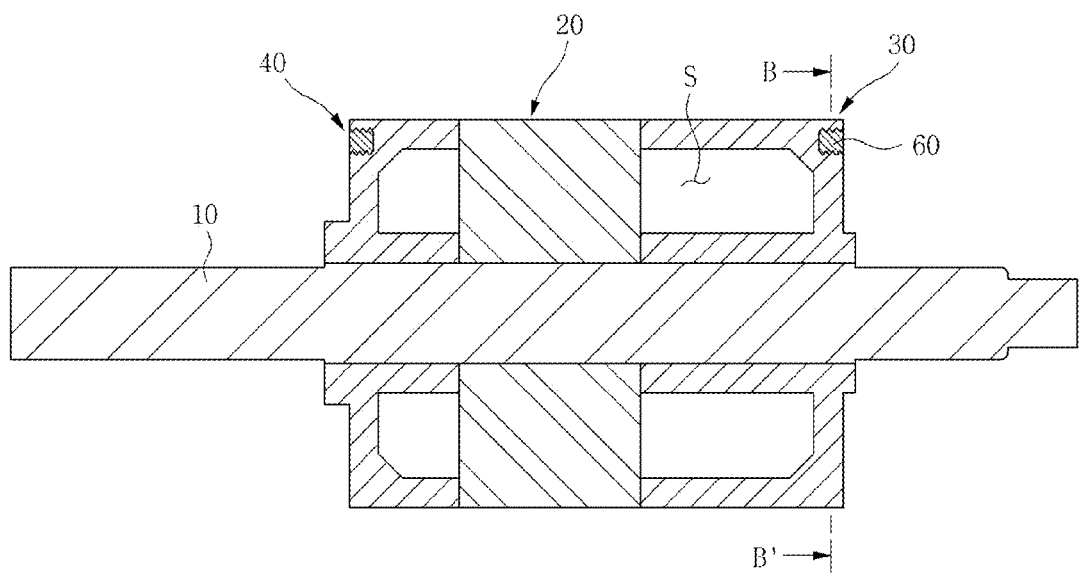
FIG. 3 is a cross-sectional view of a switched reluctance motor according to another preferred embodiment of the present invention.
Figure 4:
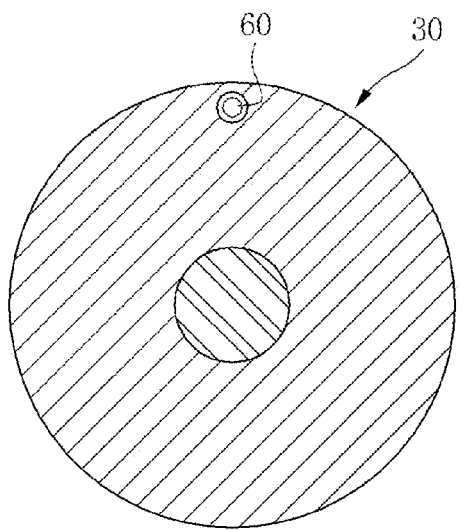
FIG. 4 is a cross-sectional view taken along the line B-B' of FIG. 3.

FIG. 3 is a cross-sectional view of a switched reluctance motor according to another preferred embodiment of the present invention; and FIG. 4 is a cross-sectional view taken along the line B-B' of FIG. 3.

The switched reluctance motor according to another preferred embodiment of the present invention includes a shaft 10 forming the rotation center of the motor; a rotor part 20 rotatably coupled onto the shaft 10; a first stopper 30 coupled to an upper portion of the rotor part 20 in the axial direction to support the rotor part 20; and a second stopper 40 coupled to a lower portion of the rotor part 20 in the axial direction to support the rotor part 20, wherein the first stopper 30 or the second stopper 40 has a separate internal space S formed at an inner side thereof, and the first stopper 30 or the second stopper 40 includes a set screw 60 coupled to one side thereof for rotation balancing of the motor.

The shaft 10 forms the rotational center of the motor and is formed to be extended in the axial direction. The shaft 10, which forms a rotational center axis of motor driving, may have a rotor part 20 and stoppers to be described below coupled thereonto.

The rotor part 20 may be configured to include an annular rotor core 21 and a plurality of rotor poles protruded outwardly from the rotor core 21. The rotor core 21 has a hollow hole formed at a central portion thereof, and the shaft 10 is fixedly coupled to the hollow hole to thereby transfer rotation of the rotor part 20 to the outside. The plurality of rotor poles 22 may be formed to be protruded outwardly along an outer circumferential surface of the rotor core 21 and be formed to correspond to a stator salient pole 72 to be described below.

The first stopper 30 is coupled to the upper portion of the rotor part 20 in the axial direction to thereby serve to support the rotor part 20. The first stopper 30 is coupled to the shaft 10 while supporting the rotor part 20, thereby rotating together with the rotor part 20. The first stopper 30 may support the rotor part 20 in the axial direction and may be made of a resin such as a plastic, or the like to thereby be formed as a balancing member capable of adjusting rotation balancing at the time of rotation of the motor. Particularly, in another preferred embodiment of the present invention, the first stopper 30 is manufactured by an injection method so as to have a predetermined space formed in an inner portion thereof; such that the set screw 60 for balancing at the time of the rotation of the motor may be coupled to an outer side of the internal space S of the first stopper 30. When the set screw 60 is coupled to the outer side of the first stopper 30, it is coupled to the outer side of the first stopper 30 so that a portion protruded from a coupled surface of the outer surface of the first stopper 30 is not present. That is, since the set screw 60 does not have a separate head portion, it is coupled to the first stopper 30 so as to be completely inserted into the coupled surface of the first stopper 30, thereby making it possible to remove the protruded portion. The set screw 60 for balancing is coupled to the outer side of the first stopper 30 without the protruded portion, thereby making it possible to prevent wind noise that may be generated at the time or high speed rotation of the motor. In addition, the rotation balancing may be more reliably controlled through various combinations of coupling according to a length or weight of the set screw 60. The set screw 60 may be coupled to an appropriate position for rotation balancing such as the side, the upper surface, or the like, of the first stopper 30.

In addition, the first stopper 30 may be formed by processing a plastic, or the like, or be formed integrally with the rotor part 20 by injection.

The second stopper 40 is coupled to the lower portion of the rotor part 20 in the axial direction to thereby serve to support the rotor part 20. The second stopper 40 has a configuration similar to that of the first stopper 30 described above. In addition, a material and a manufacturing method of the second stopper 30 are the same as those of the first stopper 30 described above. The second stopper 40 may also be made of a plastic material to thereby be used as a balancing member for maintaining the rotation balancing of the rotor part 20. In addition, the set screw 60 is coupled to an outer side of the second stopper 40, thereby making it possible to control the rotation balancing of the motor. Since a specific method and structure thereof are overlapped with those of the first stopper 30, a detailed description will be omitted.

Figure 5:
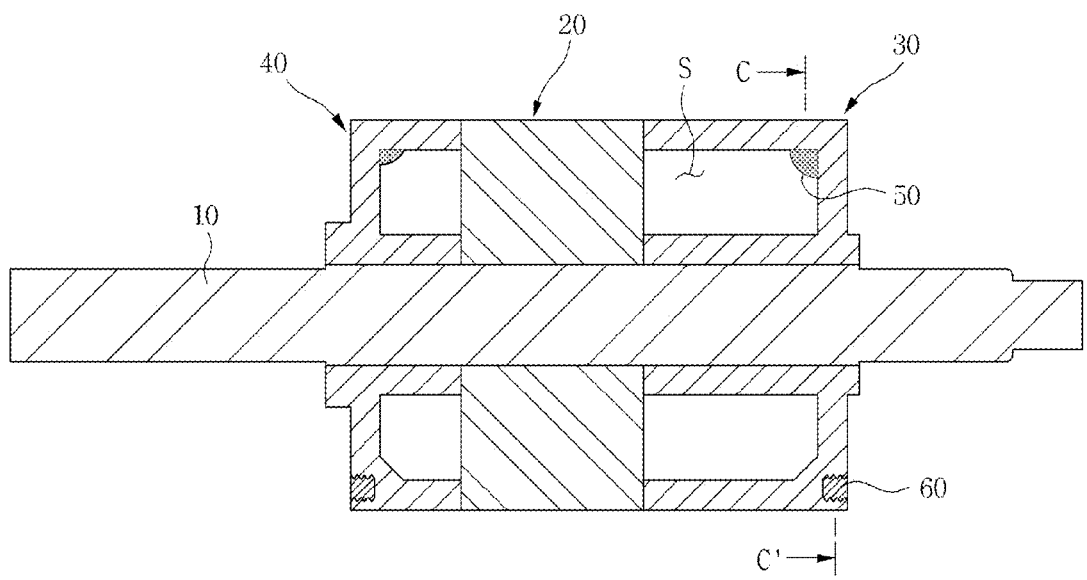
FIG. 5 is a cross-sectional view of a switched reluctance motor according to still another preferred embodiment of the present invention.
Figure 6:
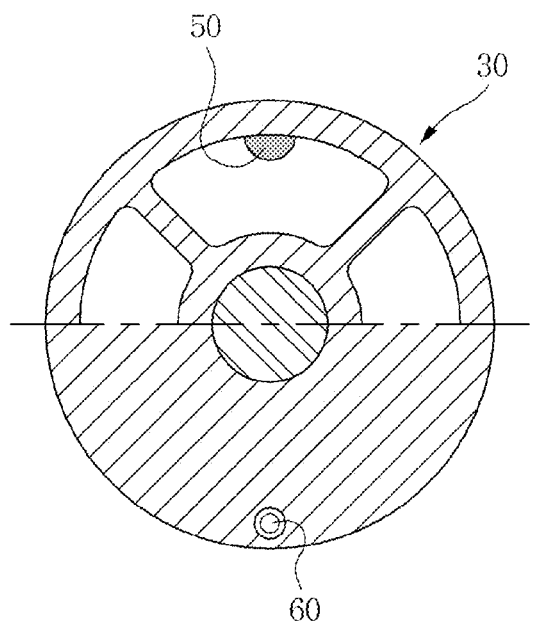
FIG. 6 is a cross-sectional view taken along the line C-C' of FIG. 5.

FIG. 5 is a cross-sectional view of a switched reluctance motor according to still another preferred embodiment of the present invention; and FIG. 6 is a cross-sectional view taken along the line C-C' of FIG. 5.

According to still another preferred embodiment of the present invention, the coupling of the weight member 50 for the rotation balancing according to the preferred embodiment of the present invention and the coupling of the set screw 60 according to another preferred embodiment of the present invention are mixed with each other, thereby making it possible to more easily secure reliability in the rotation balancing control. According to still another embodiment of the present invention, a combination of two methods, that is, a method of coupling the weight member 50 to one side of the internal space S of the first stopper 30 or the second stopper 40 and a method of coupling the set screw 60 to the outer side thereof is used, thereby controlling the rotation balancing. Since other configurations and acting effects thereof are overlapped with contents described with reference to FIGS. 1 to 4, a description thereof will be omitted.

Figure 7:
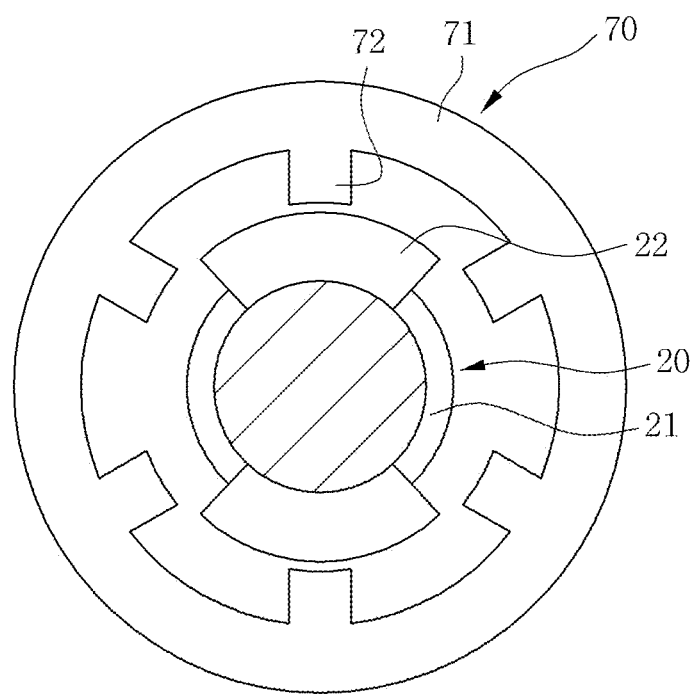
FIG. 7 is a cross-sectional view of a rotor part according to the preferred embodiment of the present invention.

FIG. 7 is a cross-sectional view of a rotor part 20 according to the preferred embodiment of the present invention.

As shown in FIG. 7, a stator part 70 is configured to include a stator yoke 71 and stator salient poles 72. The stator yoke 71 may include a hollow hole formed so as to receive the rotor part 20 therein, and a plurality of stator salient poles 72 may be formed to be protruded from an inner side of the stator yoke 71 and correspond to the rotor poles 22 of the rotor part 20. Current is applied to the stator salient poles 72 of the stator yoke 71 to form a magnetic flux path through the stator salient poles 72 and the rotor poles 22 of the rotor part 20 facing the stator salient poles 72, such that the rotor part 20 rotates. Here, a ratio of the number of stator salient poles 72 of the stator part 70 to the number of rotor poles 22 of the rotor part 20 is not limited to a combination shown in FIG. 7. That is, the rotor part 20 may be formed through various combinations by those skilled in the art.

Although not shown, the switched reluctance motor according to the preferred embodiment of the present invention may further include a motor housing formed to enclose the first stopper 30, the rotor part 20, and the second stopper 40. The motor housing protects internal components thereof such as the rotor part 20, the stator part 70, and the like, and prevents other foreign materials from being introduced thereinto, thereby improving reliability of the operation of the motor.

As set forth above, according to the preferred embodiments of the present invention, the stopper having a space formed in an inner portion thereof is coupled to the upper or lower portion of the rotor part in the axial direction in order to maintain the rotation balancing of the rotor part of the switched reluctance motor and the weight member such as an adhesive, or the like, is coupled to the inner portion of the stopper to prevent separation of the weight member even at the time of high speed rotation of the switched reluctance motor, thereby making it possible to secure reliability in maintaining the rotation balancing of the switched reluctance motor.

In addition, the stopper having a space formed in an inner portion thereof is coupled to the upper or lower portion of the rotor part in the axial direction in order to maintain the rotation balancing of the rotor part of the switched reluctance motor and the weight member such as an adhesive, or the like, is coupled to one side of the internal space of the stopper, thereby making it possible to prevent generation of wind noise at the time of high speed rotation of the switched reluctance motor.

Further, the stopper having a space formed in an inner portion thereof is coupled to the upper or lower portion of the rotor part in the axial direction in order to maintain the rotation balancing of the rotor part of the switched reluctance motor and the set screw without a protruded portion is coupled to the outer side of the stopper, thereby making it possible to prevent generation of wind noise.

Moreover, the stopper having a space formed in an inner portion thereof is coupled to the upper or lower portion of the rotor part in the axial direction in order to maintain the rotation balancing of the rotor part of the switched reluctance motor and the weight member such as an adhesive, or the like, is coupled to one side of the internal space of the stopper or the set screw is coupled to the outer side of the stopper, such that a separate dedicated machine and a dust collector are not required, thereby making it possible to improve productivity.

Furthermore, the stopper having a space formed in an inner portion thereof is coupled to the upper or lower portion of the rotor part in the axial direction in order to maintain the rotation balancing of the rotor part of the switched reluctance motor and the set screw having various lengths and weights is coupled to the outer side of the stopper, thereby making it possible to improve easiness and reliability in maintaining the balancing of the rotor part.

In addition, the stopper having a space formed in an inner portion thereof is coupled to the upper or lower portion of the rotor part in the axial direction in order to maintain the rotation balancing of the rotor part of the switched reluctance motor and a scheme of coupling the weight member such as an adhesive, or the like, to one side of the internal space of the stopper and a scheme of coupling the set screw to the outer side of the stopper are mixed with each other, thereby making it possible to further secure reliability in maintaining the balancing.

Although the preferred embodiments of the present invention have been disclosed for illustrative purposes, they are for specifically explaining the present invention and thus a switched reluctance motor according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A switched reluctance motor comprising:
   a shaft forming the rotation center of the motor;
   a rotor part rotatably coupled onto the shaft;
   a first stopper coupled to an upper portion of the rotor part in the axial direction to support the rotor part; and
   a second stopper coupled to a lower portion of the rotor part in the axial direction to support the rotor part,
   wherein the first stopper or the second stopper has a separate internal space formed at an inner side thereof.

2. The switched reluctance motor as set forth in claim 1, wherein a weight member is coupled to one side of the internal space of the first stopper or the second stopper.

3. The switched reluctance motor as set forth in claim 2, wherein the weight member is an adhesive.

4. The switched reluctance motor as set forth in claim 1, wherein the rotor part includes an annular rotor core and a plurality of rotor poles protruded outwardly from the rotor core.

5. The switched reluctance motor as set forth in claim 1, wherein the first stopper or the second stopper is manufactured by an injection method.

6. The switched reluctance motor as set forth in claim 1, wherein the first stopper or the second stopper is formed as a balancing member for maintaining rotation balancing of the switched reluctance motor.

7. The switched reluctance motor as set forth in claim 1, further comprising a stator part including a stator yoke receiving the rotor part therein and stator salient poles formed to be spaced apart from each other so as to correspond to the rotor poles and formed to be protruded inwardly of the stator yoke.

8. A switched reluctance motor comprising:
   a shaft forming the rotation center of the motor;
   a rotor part rotatably coupled onto the shaft;
   a first stopper coupled to an upper portion of the rotor part in the axial direction to support the rotor part; and a second stopper coupled to a lower portion of the rotor part in the axial direction to support the rotor part,
   wherein the first stopper or the second stopper has a separate internal space formed at an inner side thereof, and the first stopper or the second stopper includes a set screw coupled to one side thereof for rotation balancing of the motor.

9. The switched reluctance motor as set forth in claim 8, wherein the set screw is coupled to the first stopper or the second stopper so as to be completely inserted into an outer coupled surface of the first stopper or the second stopper.

10. The switched reluctance motor as set forth in claim 8, wherein the rotor part includes an annular rotor core and a plurality of rotor poles protruded outwardly from the rotor core.

11. The switched reluctance motor as set forth in claim 8, wherein the first stopper or the second stopper is manufactured by an injection method.

12. The switched reluctance motor as set forth in claim 8, wherein the first stopper or the second stopper is formed as a balancing member for maintaining rotation balancing of the switched reluctance motor.

13. The switched reluctance motor as set forth in claim 8, further comprising a stator part including a stator yoke receiving the rotor part therein and stator salient poles formed to be spaced apart to from each other so as to correspond to the rotor poles and formed to be protruded inwardly of the stator yoke.

14. The switched reluctance motor as set forth in claim 8, wherein a weight member is coupled to one side of the internal space of the first stopper or the second stopper.

15. The switched reluctance motor as set forth in claim 14, wherein the weight member is an adhesive.

* * * * *